United States Patent [19]
Miyata

[11] 3,717,599
[45] Feb. 20, 1973

[54] COMPOSITION FOR FORMING STRIPPABLE AND ANTI-CORROSIVE FILM

[75] Inventor: Kazuo Miyata, Hodogaya-ku, Yokohama, Japan

[73] Assignee: Kurita Water Industries, Ltd., Osaka-shi, Japan

[22] Filed: Oct. 12, 1970

[21] Appl. No.: 80,137

Related U.S. Application Data

[63] Continuation-in-part of Ser. No. 819,934, April 28, 1969, abandoned.

[30] Foreign Application Priority Data

May 13, 1968   Japan..................................43/32095

[52] U.S. Cl..............260/23 R, 106/14, 117/132 C, 117/161 UZ, 117/161 UB, 117/161 UC, 260/23 XA, 260/23 AR
[51] Int. Cl..................................................C09d 5/08
[58] Field of Search..117/132 C; 260/23 XA, 23 AR, 260/23 R, 23 EM

[56] References Cited

UNITED STATES PATENTS

| | | | |
|---|---|---|---|
| 3,294,726 | 12/1966 | Wyner | 260/29.6 |
| 3,053,692 | 9/1962 | Pocock | 117/132 X |
| 2,996,470 | 8/1961 | Cole et al. | 260/23 X |
| 2,140,048 | 12/1938 | Fikentscher et al. | 260/23 |
| 3,318,829 | 5/1967 | Ptasienski | 117/132 X |
| 3,249,570 | 5/1966 | Potts et al. | 117/132 X |

OTHER PUBLICATIONS

Chemical Abstracts, Vol. 56, 4470e (1961)
Chemical Abstracts, Vol. 63, 7205a (1965)
Chemical Abstracts, Seventh Collective Index Vols. 56–65, 1962–1966 pg. 15,873S

*Primary Examiner*—Donald E. Czaja
*Assistant Examiner*—Donald J. Barrack
*Attorney*—Woodhams, Blanchard & Flynn

[57] ABSTRACT

An anti-corrosive film forming composition for protecting corrodable metal objects comprised of a synthetic resin emulsion containing a minor amount of corrosion inhibitor is improved by incorporating 0.5 to 3 percent by weight, based on the weight of the resin, of an oleic acid compound selected from the group consisting of oleic acid and its alkali metal, ammonium and amine salts, thus rendering the emulsion capable of forming an anti-corrosive and strippable film.

7 Claims, No Drawings

COMPOSITION FOR FORMING STRIPPABLE AND ANTI-CORROSIVE FILM

CROSS REFERENCE TO RELATED APPLICATION

This application is a continuation-in-part of application Ser. No. 819,934, filed Apr. 28, 1969, now abandoned.

BACKGROUND OF THE INVENTION

This invention is in the field of chemical compositions for use in forming a strippable anti-corrosive protective film for metal objects that are subject to weathering and/or oxidative or other corrosive environment during storage or shipment.

Metal objects and the like such as machinery, machinery parts, tools and similar materials are liable to be scratched or otherwise oxidize on their surfaces when they are stored or transported, and therefore it has been customary to protect them by applying to them various types of protective films.

One of the common of such prior film forming agencies has been an emulsion of a synthetic or natural resin. These emulsion compositions have a number of advantages, but the inherent presence of an emulsifying agent results in the formation of a hydrophilic film. This kind of film, though serving as a mechanical protection, invokes the oxidative deterioration of the metal surface, e.g. rusting, because of its hydrophilic character.

As an example, prior emulsions of such resins as polyvinyl chloride, polyvinylidene chloride, polyvinyl acetate and poly (lower alkyl) acrylates have heretofore been used in applying protective films on the surfaces of objects made of such materials as metal, glass, stone, plastic and the like. But these emulsions, particularly those commonly used of the oil-in-water type, contain substantial quantities of water and emulsifying agent, so that in the event they are applied to a corrodable metal such as mild steel, they are liable to cause corrosion of the coated object even under ordinary indoor storage conditions. This disadvantage is aggravated under such conditions of high temperature and high humidity as are commonly encountered in storage and shipment.

Moreover, commonly used resins such as polyvinyl chloride and polyvinylidene chloride are unstable when exposed to ultraviolet light such as is present in ordinary sunlight and are unstable to heat, especially in the presence of ultraviolet light. This disadvantage is aggravated by deterioration of the plasticizer normally present, and it often happens that the resin film alters by degradation in quality so as to be prone to corrode the coated metal object and derogate from the strippability of the film, when the coated object is placed in the weathering environment of the open air or in any environment of elevated temperature.

The use of corrosion inhibitors in such films is known, and corrosion is suppressed by employing some prior film forming compositions in which is mixed substances having anticorrosive properties such as chromates, phosphates and the like, with the emulsion for the purpose of preventing the rusting referred to above. This prior measure, though suppressing corrosion to a substantial degree, nevertheless introduces the serious disadvantage of impaired strippability, and such compositions when applied to objects tend to stick fast to the surface, especially that of a corrodable metal object, and it is difficult to remove or strip the film when the objects are prepared to be put in use.

SUMMARY OF THE INVENTION

The invention provides an anti-corrosive film forming composition which avoids the disadvantages heretofore encountered, and provides an effectively protective film which is both anti-corrosive and easily strippable.

The strippable and anti-corrosive film-forming emulsion composition provided by this invention is preferably an emulsion of a resin in which the aqueous component is the continuous phase, i.e. oil-in-water. The resin is selected from polyvinyl chloride, polyvinyl (lower acyl) esters, polyvinylidene chloride, poly (lower alkyl) acrylates, and poly (lower alkyl) methacrylates and copolymers thereof and has incorporated therein a minor amount of a metal corrosion inhibitor which is preferably water-soluble. Further incorporated therein is an oleic acid compound, preferably of the group consisting of oleic acid and the sodium, potassium, ammonium and amine salts of oleic acid.

In the above polyvinyl lower acyl esters, the acyl group can be that of a hydrocarbon carboxylic acid of two to five carbon atoms, and the lower alkyl group of the acrylates and methacrylates can be an alkyl group of from one to four carbon atoms.

The novel resin weatherproof film formed on the surfaces of objects to be protected, by application of the novel emulsions of this invention is characterized by its superior anti-corrosiveness and its unobvious strippablilty.

DESCRIPTION OF THE PREFERRED EMBODIMENT

According to this invention an emulsion capable of forming a mechanically and chemically protective strippable weather proof film is provided by the resin emulsion above described.

Preferred examples of the resin are polyvinyl chloride, polyvinyl acetate, polyvinyl propionate, polyvinylidene chloride, poly (methyl acrylate), poly (methyl methacrylate), poly (ethyl methacrylate), poly (butyl methacrylate), poly (propylacrylate), poly (butyl acrylate), copolymers of ethyl acrylate and methyl methacrylate, copolymers of butyl acrylate and methyl methacrylate and the like.

Preferred examples of the anti-corrosive agents are water-soluble agents such as sodium nitrite, potassium nitrite, sodium benzoate, sodium or potassium chromate, sodium or potassium bichromates, sodium or potassium poly phosphates and the like. These inhibitors can be used singly or in combination. The corrosion inhibitor is used in an amount in the range of from about 2 to 5 percent by weight, based on the weight of the resin.

Preferred oleic acid compounds are oleic acid, and salts of oleic acid, preferably selected from an alkali metal salt of oleic acid such as sodium or potassium oleate, ammonium oleate, an oleic acid salt of an amine such as the N-alkyl trimethylene diamines such as N,N-dimethyl trimethylene diamine, and an oleic acid salt of an alkyl amine such as ethyl amine and dimethyl amine.

The oleic acid compound can be used singly or compatable mixtures can be used. The oleic acid compound is used in an amount in the range of from about 0.5 to 3 percent by weight, based on the weight of the resin.

The films can be applied to any object that requires protection against abrasion and corrosion and are particularly useful for protecting ferrous metals such as mild steel. They can nevertheless be applied to objects made of steel or iron alone or combinations of iron, steel, non-ferrous metals, glass, stone, plastic or the like.

The emulsion can be applied by any convenient means as by dipping, spraying, brushing or the like.

The emulsions of this invention, for example, when applied to mild steel as a coating and the coating permitted to dry to a film, displays superior anti-corrosive properties of rust inhibition under prolonged storage, either indoor or outdoor, and retains the property of being easily strippable.

The following examples illustrate the invention:

EXAMPLE 1

In this example, 0.2 part of oleic acid was mixed with 100 parts of an emulsion of poly (methyl acrylate) (comprising 30 percent of resin), and then an aqueous solution prepared by dissolving 1.5 parts of sodium nitrite in 5 parts of water was added and the resultant mixture was thoroughly blended. The resin emulsion thus obtained was applied to the surfaces of separate samples of mild steel, one having a clean ground surface and the other an etched surface. The coated samples were dried, thereby to form transparent films on each. Subsequently the surfaces of both samples of thus coated mild steel were exposed to an environment wherein the temperature was 60° C. and the relative humidity was more than 95 percent. Comparison of anti-corrosiveness (based on visual estimation) and strippability (based on stripping tests by hand) of the film formed by applying the resin emulsion only (as shown as comparative Example 1) and that formed by applying an emulsion comprising the same resin emulsion plus sodium nitrite only (as shown as comparative Example 2) resulted in the findings as shown in Table 1. In this context, the Rating Number appearing in the anti-corrosiveness column indicates the rating number of JIS D 0201–1964. (The same applies hereinafter.)

Note: Said JIS (Japanese industrial standard) D 0201–1964 is based on the "general rules of electroplating for automobile parts" and is a method for rating the degree of corrosion of the surface of metals in terms of the rate of corroded area. More specifically, there are provided standard charts corresponding to the respective rating numbers for the sake of comparison, and the Rating Number is determined by evaluation of the post-test state of the metal surface by means of visual estimation in comparison with said charts. Said standard charts are summarized as follows:

| Rating Number | Rate of Corded Area (%) |
|---|---|
| 10 | 0 |
| 9 | less than 0.1 |
| 8 | from 0.1 to less than 0.25 |
| 7 | from 0.25 to less than 0.5 |
| 6 | from 0.5 to less than 1.0 |
| 5 | from 1.0 to less than 2.5 |
| 4 | from 2.5 to less than 5.0 |
| 3 | from 5.0 to less than 10 |
| 2 | from 10 to less than 25 |
| 1 | from 25 to less than 50 |
| 0 | 50 and over |

TABLE 1

| | Strippability | Anti-corrosiveness |
|---|---|---|
| Comparative Ex. 1 | Not strippable because of rust. | Rusted all over the surface in a day. No. after 3 days ... 0 |
| Comparative Ex. 2 | Film on the ground surface is barely strippable. Film on the etched surface is not strippable at all. | No rust for 1 month. Rating Number after 1 month ... 10 |
| Ex. 1 | Film on either surface is easily strippable. | No rust for 1 month. Rating Number after 1 month ... 10 |

EXAMPLE 2

In this example, 1.5 parts of N-octadecyl-trimethylene-diamine dioleate was added to 100 parts of an emulsion of polyvinyl acetate (comprising 55 percent of resin, of which 20/100 was dibutyl phthalate) and blended, and then an aqueous solution prepared by dissolving 2.5 parts of sodium chromate in 7 parts of water was added to the resultant mixture and thoroughly blended by stirring. The resin emulsion thus obtained was applied onto the surface of mild steel and was dried to thereby form a resin film. Subsequently, the thus treated surface of mild steel was subjected to indoor exposure to evaluate the anti-corrosiveness and strippability of said film.

Tests were also conducted on the respective films formed by employing the resin emulsion only (as shown as comparative Example 3) and sodium chromate only (as shown as comparative Example 4) in the same manner as above, and the results thereof were as shown in the following Table 2.

Table 2

| | Strippability | Anti-corrosiveness |
|---|---|---|
| Comparative Ex. 3 | Film once dried was not strippable. | Rusted all over the surface within 1 month. No. after 1 month ... 4 |
| Comparative Ex. 4 | Film once dried was not strippable. | No rust for more than 3 months. Rating Number after 3 months ... 10 |
| Ex. 2 | Film was easily strippable after 3 months. | No rust for more Rating Number after 3 months ... 10 |

EXAMPLE 3

In this example, 0.5 part of sodium oleate was mixed with 100 parts of the copolymer (comprising 45 percent of solid matter) of ethyl acrylate-methyl methacrylate (60:40), and then an aqueous solution prepared by dissolving 2 parts of a mixture comprising sodium nitrite and sodium benzoate (1:1) in 7 parts of water was added to the resultant mixture and the mixture was thoroughly blended by stirring. The emulsion thus obtained was applied to the ground surface of a sample of mild steel and dried to form a film thereon; and then a test of anti-corrosiveness was conducted under a temperature of 60° C. and a relative humidity of 97 percent.

Tests were also conducted on the respective film formed by employing the resin emulsion only (as shown as comparative Example 5) and by adding a corrosion inhibitor only (as shown as comparative Example 6) in the same manner as above, and the results thereof were as shown in the following Table 3.

Table 3

| | Strippability | Anti-corrosiveness |
|---|---|---|
| Comparative Ex. 5 | Film once solidified was hard to strip. | Rusted all over the surface after 3 days. No. after 3 days . . . 0 |
| Comparative Ex. 6 | Film once solidified was hard to strip. | No rust even after 1 month. Rating Number after 1 month . . . 10 |
| Ex. 3 | Film was easily strippable after 1 month. | No rust even after 1 month. Rating Number after 1 month . . . 10 |

EXAMPLE 4

In this example, 0.5 part of sodium oleate was mixed with 100 parts of an emulsion of butyl acrylate-methyl methacrylate (40:60) copolymer (comprising 48 percent of solid matter), and then an aqueous solution prepared by dissolving 2 parts of a mixture consisting of sodium nitrite and sodium benzoate (1:1) in 7 parts of water was added to the resultant mixture and was thoroughly blended by stirring. The resin emulsion thus obtained was applied to the ground surface of a sample of mild steel and was dried to form a film thereon. Subsequently, the test of the anti-corrosiveness of the film thus formed was conducted by exposing the coated sample to an environment at a temperature of 60° C. and a relative humidity of 97 percent.

Tests were also conducted on respective films formed by employing the resin emulsion only (as shown as Comparative Example 7) and by adding a corrosion inhibitor only (as shown as Comparative Example 8) in the same manner as above, and the results thereof were as shown in the following Table 4.

Table 4

| | Strippability | Anti-corrosiveness |
|---|---|---|
| Comparative Ex. 7 | Film once solidified was hard to strip. | Rusted all over the face after 3 days. Rating Number after 3 days . . . 0 |
| Comparative Ex. 8 | Film once solidified was hard to strip. | No rust even after 1 month. Rating Number after 1 month . . . 10 |
| Ex. 4 | Film was easily strippable after 1 month. | No rust even after 1 month. Rating Number after 1 month . . . 10 |

Example 5

In this example, 1.5 parts of N-octadecyl-trimethylene-diamine dioleate was mixed with 100 parts of an emulsion of butyl methacrylate polymer (comprising 40 percent of solid matter), and then an aqueous solution prepared by dissolving 5 parts of sodium nitrite in 5 parts of water was added to the resultant mixture and was thoroughly blended by stirring. The resin emulsion thus obtained was applied to the ground surface of a sample of mild steel and was dried to form a film thereon. Subsequently, the test of the anti-corrosiveness of the film thus formed was conducted by exposure at a temperature of 60° C. and a relative humidity of 97 percent.

Tests were also conducted on respective films formed by employing the resin emulsion only (as shown as Comparative Example 9) and by adding a corrosion inhibitor only (as shown as Comparative Example 10) in the same manner as above, and the results thereof were as shown in the following Table 5.

Table 5

| | Strippability | Anti-corrosiveness |
|---|---|---|
| Comparative Ex. 9 | Film once solidified was hard to strip. | Rusted all over the surface after 1≈3 days. Rating Number after 3 days . . . 0 |
| Comparative Ex. 10 | Film once solidified was hard to strip. | No rust even after 1 month. Rating Number after 1 month . . . 10 |
| Ex. 5 | Film was easily strippable after 1 month. | No rust even after 1 month. Rating Number after 1 month . . . 10 |

In the foregoing examples analogous results can be obtainable with other ferrous metals such as the various irons and steels. Likewise the substitution of any of the oleic acid compounds mentioned above yields films that are protective and easily strippable even after exposure of the coated object to extremes of oxidative and weathering environments for prolonged periods of time.

The embodiments of the invention in which an exclusive property or privilege is claimed are defined as follows:

1. In an emulsion-type film forming composition in which the film forming constituent consists essentially of an emulsion of a resin selected from the group consisting of polyvinyl lower acyl esters in which the acyl has from two to five carbon atoms, poly (lower alkyl) acrylates in which the alkyl has from one to four carbon atoms, poly (lower alkyl) methacrylates in which the alkyl has from one to four carbon atoms, and copolymers thereof; said composition containing a minor amount of metal corrosion inhibitor, the improvement which comprises incorporating in said emulsion composition from about 0.5 to about 3 percent by weight, based on the weight of the resin, of an oleic acid compound selected from the group consisting of oleic acid and salts of oleic acid.

2. The film forming composition of claim 1, wherein the resin is poly methylmethacrylate and the oleic acid compound is oleic acid.

3. The film forming composition of claim 1, wherein the resin is polyvinyl acetate and the oleic acid compound is N-octadecyl-trimethylenediamine dioleate.

4. The film forming composition of claim 1, wherein the resin is a copolymer of ethyl acrylate and methyl methacrylate, and the oleic acid compound is sodium oleate.

5. The film forming composition of claim 1, wherein the resin is a copolymer of butyl acrylate and methyl methacrylate and the oleic acid compound is sodium oleate.

6. The film forming composition of claim 1, wherein the resin is polybutyl methacrylate and the oleic acid compound is N-octadecyl-trimethylenediamine dioleate.

7. The film forming composition according to claim 1, in which the oleic acid compound is selected from the group consisting of oleic acid and the sodium, potassium, ammonium and amine salts of oleic acid.

* * * * *